F. A. PERRY.
Window Shade.
No. 32,529. Patented June 11, 1861.
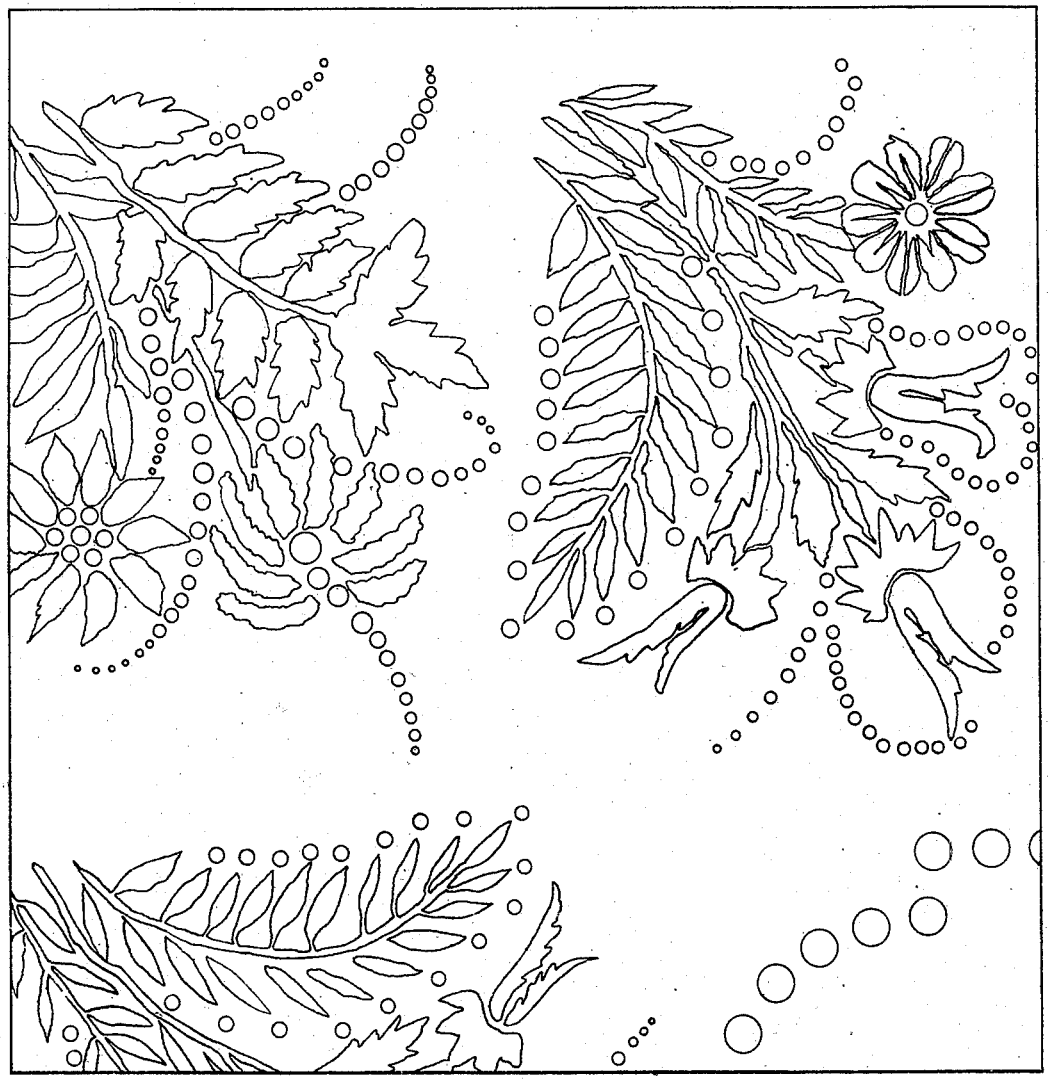

UNITED STATES PATENT OFFICE.

F. A. PERRY, OF ST. LOUIS, MISSOURI.

ORNAMENTED FABRIC OR MANUFACTURE FOR WINDOW-SHADES.

Specification of Letters Patent No. 32,529, dated June 11, 1861.

*To all whom it may concern:*

Be it known that I, F. A. PERRY, of the city of St. Louis and State of Missouri, have invented a new and useful Manufacture to be Used for Window-Shades and Similar Purposes; and I do hereby declare that the following is a full, clear, and exact description of the manner of making and preparing the same.

I first take a kind of fabric known in the trade as "Swiss mull" and stretch it over a frame—such as ordinarily used in the manufacture of window shades. I then coat or size this fabric with a composition composed of glue, soda soap, alum and water mixed together in the following proportions and manner, viz—one pound of best white glue—soaked in two gallons of soft water together with one ounce of soda soap—which let stand for from four to six hours, then raise the temperature by a gentle heat to near the boiling point, when one ounce of pulverized alum is added and the mass thoroughly stirred until the whole is dissolved, making a sizing solution sufficient to size about twelve window shades six feet in length and three in breadth. This solution is quickly applied to the fabric with an ordinary white wash brush of good quality. One coat will ordinarily be sufficient, but to render the article more opaque a second coat must be applied. After the sizing has been thus applied, and become quite dry, the surface should be lightly and quickly rubbed with a smooth pumice stone to polish and perfect it. It has now to be ornamented with such figures as fancy may suggest—in imitation of tambour or needle embroidery, arranged to suit the taste of the manufacturer. This is done by first making a stencil plate of the required design and then a composition of the following constituents, united in the following manner, viz: one half pound of best zinc white ground in boiled linseed oil and thinned with the spirits of turpentine to the consistency of cream, to which add a few drops of nut or other colorless oil. The stencil and composition being thus prepared the stencil is applied to the fabric and the composition laid on with a brush or other suitable instrument. Some of the figures, after they have been thus laid on, may be gilded, but those intended to be so treated should be made of the composition above described, with a teaspoonful of dammar varnish added, and the gold applied when the composition is nearly dry. The figures not intended to be gilded are finished by dusting pulverized pearl starch over them while yet green, through a piece of fine cotton cloth, the starch being ground very fine and made thoroughly dry. To still further ornament some or all of the figures, I sprinkle over them fine "glass floss," which gives them a glittering or crystallized appearance. After the whole of the matter has been thus applied to the fabric the outside of the frame upon which it is stretched should be smartly struck with a hammer, so as to incorporate the pulverized glass and starch with the green composition.

I claim—

As a new manufacture—a thin fabric prepared in the manner described and ornamented in imitation of embroidery—either needle or tambour—in color or white—substantially in the manner set forth.

F. A. PERRY.

Witnesses:
ROLLIN B. GRAY,
JAMES RAWLINGS.